July 23, 1968   M. GREEN   3,393,566
MINIATURE PRESSURE TRANSDUCER
Filed Feb. 18, 1966

INVENTOR.
MALCOLM GREEN
BY
Blair Buckles & Cesari
ATTORNEYS

United States Patent Office 3,393,566
Patented July 23, 1968

3,393,566
MINIATURE PRESSURE TRANSDUCER
Malcolm Green, Waban, Mass., assignor, by mesne assignments, to Bytrex, Inc., Waltham, Mass., a corporation of Massachusetts
Filed Feb. 18, 1966, Ser. No. 528,434
11 Claims. (Cl. 73—398)

ABSTRACT OF THE DISCLOSURE

A pressure transducer of small size and high sensitivity utilizes one or more load-bearing strain gages in the form of solid bars connected between a flexible diaphragm and a reference member to react to the load applied to the diaphragm. The gages are inclined at a slight angle to the plane of the diaphragm and thereby carry a substantial portion of the load applied to it so that their sensitivity is quite high.

---

A number of diaphragm-type pressure transducers using strain gages to provide electrical outputs have been in use prior to the present invention. The diaphragms are relatively compliant and their primary function is to present a sufficiently large area to the monitored pressure to obtain a force that is great enough to be readily measured. In high pressure instruments the force exerted on the diaphragm is taken up by a central supporting member and the pressure is measured indirectly by sensing its effect on this member in one way or another. Arrangements of this type have in the past not provided sufficient sensitivity for low pressure applications in cases where small size is a requisite in the instrument.

For this reason, other constructions have been proposed for low pressure transducers, but with various drawbacks. For example, in one instrument the central support is omitted, with the diaphragm itself supplying the reaction force to the load imposed on it. The deflection of the diaphragm is then sensed directly by means of strain gages bonded thereto. However, the radius of a transducer of this type is limited by the minimum required length of a strain gage having sufficient sensitivity, and as a practical matter, the radius must be at least twice the length of strain gage.

A principal object of the present invention is to provide a diaphragm-type pressure transducer using strain gage sensors and characterized by both small size and high sensitivity. In particular, a low height is highly desirable for the transducer.

A further object is to provide a transducer of the above type that is well-suited for measurement of low pressure differentials.

Another object of the invention is to provide a transducer of the above type capable of construction at relatively low cost as compared with other transducers having comparable characteristics.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

In general, a transducer incorporating the invention includes a highly compliant diaphragm to which the monitored pressure is applied. The resultant force on the diaphrgam is taken up by strain gages extending from the center of the diaphragm outwardly to a rim structure supporting the outer edge of the diaphragm. These gages are generally disposed at a relatively small angle with respect to the plane of the diaphragm, and this results in a substantial force magnification between the axial thrust of the diaphragm and the reactive stresses along the gages. As a result, the transducer is endowed with high sensitivity, yet its radius can be approximately as short as the length of a single strain gage.

Figure 1:
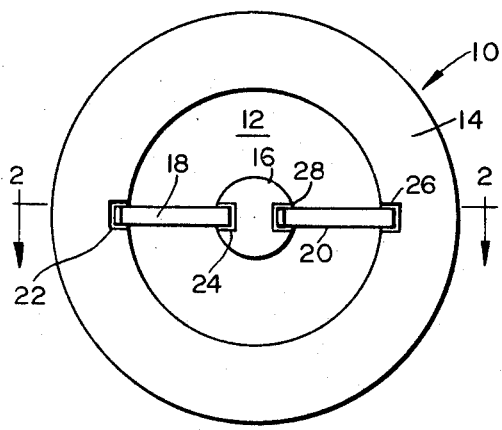
FIG. 1 is a bottom plan view of a transducer embodying the invention.
Figure 2:
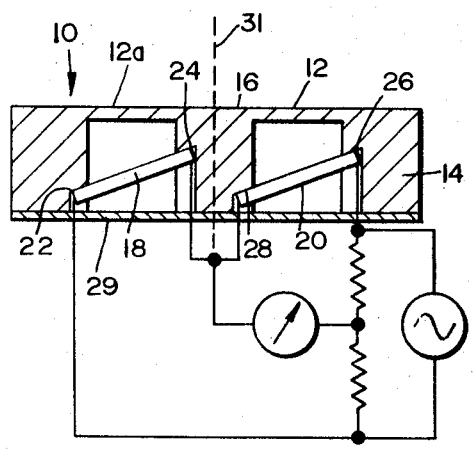
FIG. 2 is a cross-section taken along line 2—2 of FIG. 1 with a cover plate added; this figure includes a schematic representation of a bridge circuit incorporating the transducer.

As shown in FIGS. 1 and 2, the preferred embodiment of the invention is a transducer generally indicated at 10 comprising a circular diaphragm 12 supported at its outer periphery by a generally cylindrical housing 14. A central post 16 extends from the diaphragm within the housing. Preferably, the diaphragm 12, housing 14 and post 16 are fashioned as an integral unit, with the portion of the diaphragm between the post and housing being relatively thin to provide a high compliance in the diaphragm for axial deflection of the post 16 relative to the housing 14 in response to a pressure differential across the diaphragm. Although compliant in the axial direction, the diaphragm resists radial movement of the post 16.

Between the post 16 and the housing 14 are a pair of strain gages 18 and 20. The strain gage 18 is bonded at its ends to shoulders 22 and 24, which are angled to accommodate the orientation of the strain gage with respect to the plane of the diaphragm 12. Specifically, the gage 18 is inclined away from the diaphragm, proceeding radially from the post 16. Similarly, the ends of the strain gage 20 are bonded to appropriately formed shoulders 26 and 28 on the post and housing. In this case, however, the strain gage is inclined toward the diaphragm 12, proceeding radially from the post 16.

In use, the transducer may be mounted in a fixture (not shown) that applies to the outer surface 12a of the diaphragm 12 the fluid whose pressure is to be measured. On the other hand, it may be subjected on all sides to an ambient pressure to be measured. A cover plate 29 (not shown in FIG. 1) may be secured to the opposite end of the housing 14, depending on whether the monitored pressure is to be compared with the atmospheric pressure, a reference pressure within the transducer or an external reference pressure communicated to the interior of the transducer by means of tubing.

The strain gages 18 and 20 are preferably of the monocrystalline semiconductor type. As such they are capable of supporting both tension and compression stresses resulting from pressure differentials across the diaphragm 12, yet they are highly compliant and essentially insensitive with regard to bending. Thus, substantially all of the force exerted on the diaphragm is countered by longitudinal forces in the strain gages. Moreover, the foregoing construction results in a very substantial force magnification, with a consequent high overall sensitivity in the transducer.

More specifically, assume, as shown in the force diagram in FIG. 1, that the pressure differential across the diaphragm 12 results in a downward force P. Because of the high compliance of the diaphragm, essentially all of this force is concentrated in the post 16, which tends to move (inappreciably) along a thrust axis 31 with reference to the housing 14. Since the post is connected only to the strain gages 18 and 20, the axial reaction force P' must be supplied by the gages, with roughly one-half the reaction force being exerted by each of the gages. The gage 18, which is under compression in this example, thus exerts a longitudinal force $F_{18}$ whose axial component is equal to $\frac{1}{2}P'$, and similarly, the gage 20, which is in tension, exerts a force $F_{20}'$ whose axial component equals $\frac{1}{2}P'$. With the relatively small angles between the strain gages and the plane of the diaphragm, i.e. the nearly perpendicular angles between the gages and the axis of the post 16, the reaction forces $F_{18}$ and $F_{20}$ are substantially greater than the axial components thereof. The gages supply electrical output signals corresponding to their respective tension and compression forces. Therefore, relatively large signals are developed by the transducer for a given pressure differential across the diaphragm 12, i.e. the transducer exhibits a high sensivity.

By way of example, a transducer of the above type designed for the measurement of pressure differentials in the range of a fraction to 1 p.s.i., may have an overall diameter of 0.25 inch and thicknness of 0.030 inch. The thickness of the compliant portion of the diaphragm 12 is 0.0016 inch; this portion has an inner diameter of 0.08 inch and an outer diameter of 0.15 inch. Each of the gages 18 and 20 is fashioned from monocrystalline silicon, suitably doped and cut with the 111 crystalline axis extending in the longitudinal direction of the strain gage. Each gage has an overall length of 0.090 inch, a width of 0.005 inch and an overall thickness of 0.003 inch. A central portion extending for 0.030 inch has a reduced thickness of 0.001 inch. The gages form an angle of 6° with the plane of the diaphragm 12. With the gages 18 and 20 connected as adjacent arms of the conventional bridge circuit as shown, the transducer has an overall sensivity of approximately 5 millivolts per p.s.i.

In practice the strain gage angle is generally in the range of 5° to 10°.

Figure 3:
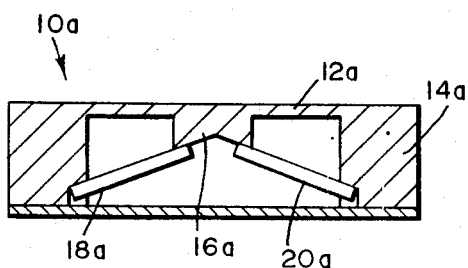
FIG. 3 is a cross-section of another transducer embodying the invention.

In the transducer 10a of FIG. 3, both the gages 18a and 20a have the same inclination with respect to the diaphragm 12a. Accordingly, because of the symmetry of this arrangement, there is less tendency of the post 16a to cant in response to the forces thereon and thereby cause "rollover" of the diaphragm 12a. On the other hand, this embodiment of the invention has less sensivity than the construction illustrated in FIG. 1, since both the strain gages 18a and 20a undergo the same type of stress, i.e. tension or compression, in response to the applied pressure.

More specifically, in order to obtain the temperature compensation which is generally desirable when semiconductor strain gages are used, two gages whose temperature coefficients of resistance are substantially equal are generally connected in adjacent arms of the bridge circuit so that their temperature-caused voltage components cancel. However, if both gages are active and they both undergo compression or tension, as the case may be, their strain-induced voltages will also cancel. Accordingly, only one of the gages, e.g. the gage 18a, is an active gage, and the other, e.g. the gage 20a, is inactive, serving only for temperature compensation. To accomplish this, the gage 18a is cut from a silicon crystal with its long axis, i.e. the direction of the compression or tension thereon, coinciding with the sensitive crystalline direction. The gage 20a, on the other hand, is cut so that its long axis coincides with the relatively insensitive 100 crystalline axis. With only one active gage, the sensitivity of the transducer 10a is less than that of the transducer 10.

Figure 4:
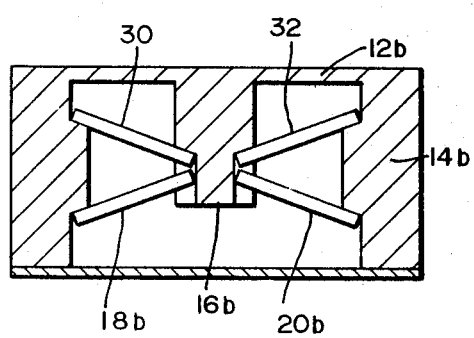
FIG. 4 is a cross-section of yet another embodiment of the invention.
Figure 5:
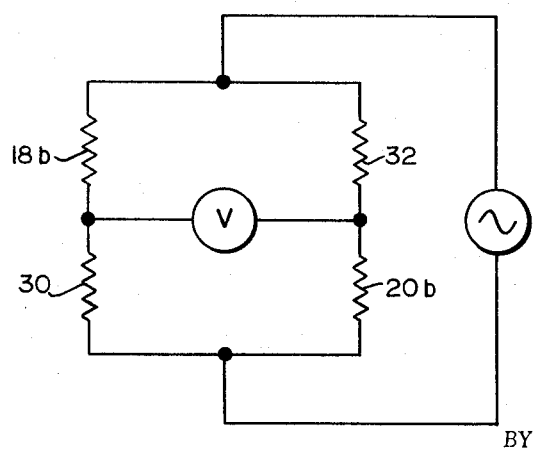
FIG. 5 is a schematic representation of a bridge circuit incorporating the transducer of FIG. 4.

The transducer 10b of FIG. 4 has the symmetry to prevent canting of the post 16b, without the concomitant decrease of sensivity associated with the construction illustrated in FIG. 3. As in FIG. 3, the strain gages 18b and 20b are both inclined away from the diaphragm 12b. Additionally, however, the transducer 10b includes strain gages 30 and 32 inclined toward the diaphragm 12b. The strain gages are all active and thus they may be connected at the four arms of a bridge circuit, as shown in FIG. 5.

In general, the canting of the diaphragm in the transducer 10 of FIG. 1 is insignificant and therefore this construction is preferred to the less sensitive transducer 10a of FIG. 2 and the transducer 10b of FIG. 3. The transducer 10b is somewhat more expensive to manufacture because of the additional strain gages and also it is somewhat thicker than the other embodiments in order to accommodate these gages.

It should be noted that the gages 18 and 20 of FIG. 1, for example, need not extend diametrically across the transducer as illustrated. Thus, it may be less expensive to fabricate the unit with the individual strain gages coinciding with radii that are perpendicular to each other or separated by some other convenient angle.

From the foregoing it will be seen that I have provided a pressure transducer combining a small size with high sensitivity. Moreover, it is readily manufactured and at a relatively low cost.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A force transducer comprising
   (A) a thrust member positioned for displacement along a thrust axis,
   (B) a reference member,
   (C) lateral restraining means
      (1) connected to said thrust member and said reference member,
      (2) incapable of exerting appreciable force on said thrust member over a range of displacement thereof along said axis with respect to said reference member,
      (3) preventing appreciable movement of said thrust member orthogonally to said axis with respect to said reference member,
   (D) at least two strain gages extending between said thrust member and said reference member, each gage
      (1) connected at one end to said thrust member,
      (2) connected at its other end to said reference member,
      (3) oriented at an acute angle with respect to a plane perpendicular to said thrust axis,
      (4) supplying substantially all of the reaction force in response to an applied force exerted on said thrust member along said thrust axis, and
      (5) sensing a force substantially greater than said applied force.

2. The combination defined in claim 1 including
   (A) a first gage inclined from said axis in a first direction with respect to said perpendicular plane, and
   (B) a second gage inclined in a second direction opposite to said first direction with respect to said plane.

3. The combination defined in claim 1 including first and second gages inclined from said thrust axis in the same direction with respect to said perpendicular plane.

4. The combination defined in claim 1 including
   (A) first and second gages inclined from said axis in a first direction with respect to said perpendicular plane, and (B) third and fourth gages inclined from said axis in a second direction opposite to said first direction with respect to said plane.

5. A pressure transducer comprising
(A) a diaphragm,
(B) a support member supporting said diaphragm at the periphery thereof,
(C) at least one strain gage,
  (1) oriented at an acute angle to said diaphragm,
  (2) extending between said diaphragm and said support member and having one end thereof connected to said diaphragm and the other end thereof connected to said support member,
  (3) providing the preponderance of the reaction force on said diaphragm in response to the force imposed thereon by a pressure differential across it, and
  (4) sensing a force substantially greater than the force resulting from said pressure differential.

6. A pressure transducer comprising
(A) a diaphragm,
(B) a diaphragm-supporting structure supporting said diaphragm at its periphery,
(C) a thrust member secured to said diaphragm so as to receive from said diaphragm the force resulting from a pressure differential across it,
(D) at least one strain gage, each of said strain gages
  (1) extending between said thrust member and said supporting structure,
  (2) being oriented at an acute angle with respect to said diaphragm,
  (3) providing most of the reaction force exerted on said diaphragm in response to said pressure differential, and
  (4) sensing a force substantially greater than said reaction force.

7. The combination defined in claim 6 including
(A) a first gage inclined from said axis in a first direction with respect to said diaphragm, and
(B) a second gage inclined in a second direction opposite to said first direction with respect to said diaphragm.

8. The combination defined in claim 6 including first and second gages inclined from said thrust axis in the same direction with respect to said diaphragm.

9. The combination defined in claim 6 including
(A) first and second gages inclined from said axis in a first direction with respect to said diaphragm and
(B) third and fourth gages inclined from said axis in a second direction opposite to said first direction with respect to said diaphragm.

10. The combination defined in claim 6 in which each said strain gage comprises a bar of strain-sensitive crystalline material having an electrical property variable in response to a force applied thereto.

11. A force transducer according to claim 1 in which each said strain gage is oriented to said plane at an angle of 10 degrees or less to thereby achieve a substantial force multiplication factor with respect to forces applied to said transducer.

References Cited

UNITED STATES PATENTS

| | | | |
|---|---|---|---|
| 2,439,146 | 4/1948 | Ruge | 73—88.5 XR |
| 2,597,751 | 5/1952 | Ruge | 73—141 XR |
| 3,124,770 | 3/1964 | Ciavatta | 73—141 XR |
| 3,213,400 | 10/1965 | Gieb | 73—398 XR |
| 3,325,761 | 6/1967 | McLellan | 73—398 XR |

DAVID SCHONBERG, *Primary Examiner.*

D. O. WOODIEL, *Assistant Examiner.*